FLYING SPOT SCANNER WITH BEAM CENTERING CIRCUIT

Filed Jan. 16, 1961 3 Sheets-Sheet 1

INVENTOR:
John T. Mullin
By Smyth, Roston & Pavitt
Attorneys

INVENTOR:
John T. Mullin
By Smyth, Roston & Pavitt
Attorneys

INVENTOR:
John T. Mullin
By Smyth, Roston & Pavitt
Attorneys

United States Patent Office 3,117,183

Patented Jan. 7, 1964

3,117,183

FLYING SPOT SCANNER WITH BEAM CENTERING CIRCUIT

John T. Mullin, Beverly Hills, Calif., assignor to Minnesota Mining and Manufacturing Company, St. Paul, Minn., a corporation of Delaware Filed Jan. 16, 1961, Ser. No. 82,858
13 Claims. (Cl. 178—7.2)

This invention relates to an electrical system for recording information on a medium such as a tape and for reproducing information from the tape. More particularly, the invention relates to an electrical system for obtaining a movement of the medium in a first direction, for recording information on the medium in successive lines transverse to the first direction and for accurately following the lines of information on the medium to reproduce such information. The invention is especially concerned with a system for providing error signals representing any deviations in the first direction in the scan of successive positions along a line and for varying the position of scan in the first direction to correct for such deviation.

Much work has been performed in recent years in developing systems for storing information such as video information and for subsequently reproducing such information. For example, systems have been developed for recording information on a moving medium such as a tape. The tape is moved at a substantially constant speed in a first direction and the information is recorded in successive lines in a second direction transverse to the first direction. To reproduce the information recorded on the tape, the medium is moved at the substantially constant speed and the information in the successive transverse lines on the tape is read and detected. Until now, magnetic tapes have been the primary medium used. In recent years, however, much work has been performed in using other types of media such as photographic and thermoplastic film.

As will be seen, it is important to accurately follow the successive lines of information on the medium in order to accurately reproduce such information. For example, any deviations in the scanning of a line should be quickly corrected since such deviations may materially affect the strength of the signals reproduced so as to correspondingly affect the accuracy with which the information is reproduced. Furthermore, if the deviations should become excessive, complete lines of information may be skipped. In view of the seriousness of this problem, a sustained effort has been devoted to producing a system which will note any deviations from a central position on each line being scanned and which will quickly correct for such deviations. In spite of such sustained effort, no system has as yet been devised which provides such rapid corrections.

This invention provides a system for detecting deviations in the scan along the central position of each line on a moving medium and for quickly correcting for such deviations in the same line as the detection of the deviations. By providing such a rapid detection and correction, the system constituting this invention eliminates any skew of the medium relative to the reproducing transducers. Furthermore, because of such quick detection of, and rapid corrections for, the deviations in the scan of each line, any corrections for deviations in each line occur independently of any corrections for the preceding or successive lines being scanned. The system constituting this invention also includes additional controls for compensating for flutter and wow in the movements of the medium.

Although the system constituting this invention is disclosed primarily to correct for deviations in the successive lines of scan on photographic film, it will be appreciated that the system can also be used without adaptation with other types of media such as thermoplastic tape. In the system constituting this invention, information is recorded as frequency modulations in the successive lines. The frequency modulations are represented as signals having first and second levels or positions in the direction of movement of the medium, the lengths of the first and second levels along the line representing the frequency of the modulations. These levels are detected to reproduce the information represented by the frequency modulations.

In the system constituting this invention, the first and second levels along each line are detected by sweeping a signal at a high frequency back and forth in the first direction. When this high frequency signal coincides with the position of the frequency modulated signal in the line being scanned, an output signal is produced. This output signal is detected in a balanced modulator such that the frequency modulations are reproduced electrically.

By scanning with a high frequency signal the frequency modulations recorded in each line, a sensitive indication can be made as to whether or not the scan is occurring on the line or is deviating in the first direction from the line. Circuitry is included in the system constituting this invention to produce an error signal having a positive polarity for a deviation in a first direction and to produce an error signal having a negative polarity for a deviation in an opposite direction. This signal is produced rapidly after the occurrence of any deviations and is introduced to the scanning means to provide rapid adjustments in the position being scanned. The circuitry providing such detection and correction has a relatively short time constant such that any error signal produced during the scan of each line disappears during the period of retrace which precedes the scan of the next line. In this way, deviations in the scan of each line are corrected rapidly and independently of deviations in the scan of the next line.

The system constituting this invention also includes circuitry for compensating for such effects as flutter and wow. These effects occur at a slower rate than the deviations during the scan of each line. Because of this, the circuitry for compensating for fluter and wow has a longer time constant than the circuitry for compensating for deviations in the scan of each line. The circuitry for compensating for flutter and wow produces signals which control the position of scan relative to the moving medium.

The medium used may be a photographic film on which signals are recorded in the form of a dark line on a light background. The medium used may also be a thermoplastic tape on which signals are recorded in the form of deformations in the surface of the tape. Because of this, it will be appreciated that the systems included in this invention may be used with a number of different media even though photographic film is hereafter specifically described. It will also be appreciated that the systems included in this invention may be used with various types of information even though it is specifically described as being used for television signals.

Figure 2:
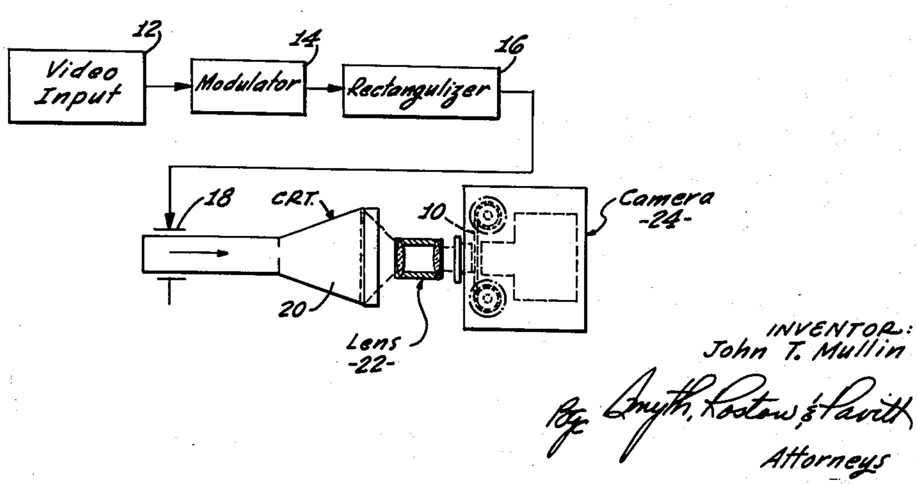
FIGURE 2 is a block diagram of a system forming a part of this invention fer recording information on the medium such as the film.

FIGURE 2 illustrates in block form a system for recording information on the moving medium such as the film 10 in accordance with the concepts of the invention. The recorder includes stages 12 for producing signals having amplitude modulations representing information such as video information. These signals are introduced to a modulator 14 to vary the frequency of the signals from the modulator in accordance with the amplitudes of the input signals to the modulator. The frequency of the unmodulated signals from the modulator 14 may conform to present practices in the television industry.

The signals from the modulator 14 are then introduced to stages 16 for operating upon the signals to provide the signals with a rectangular configuration. For example, the stages 16 may include an over-driven amplifier or a Schmidt trigger. The stages 16 operate to convert the waveshape of the frequency modulated signals to signals having at each instant either a first amplitude (which may be considered as positive) or a second amplitude (which may be considered as negative).

Figures 5, 6:
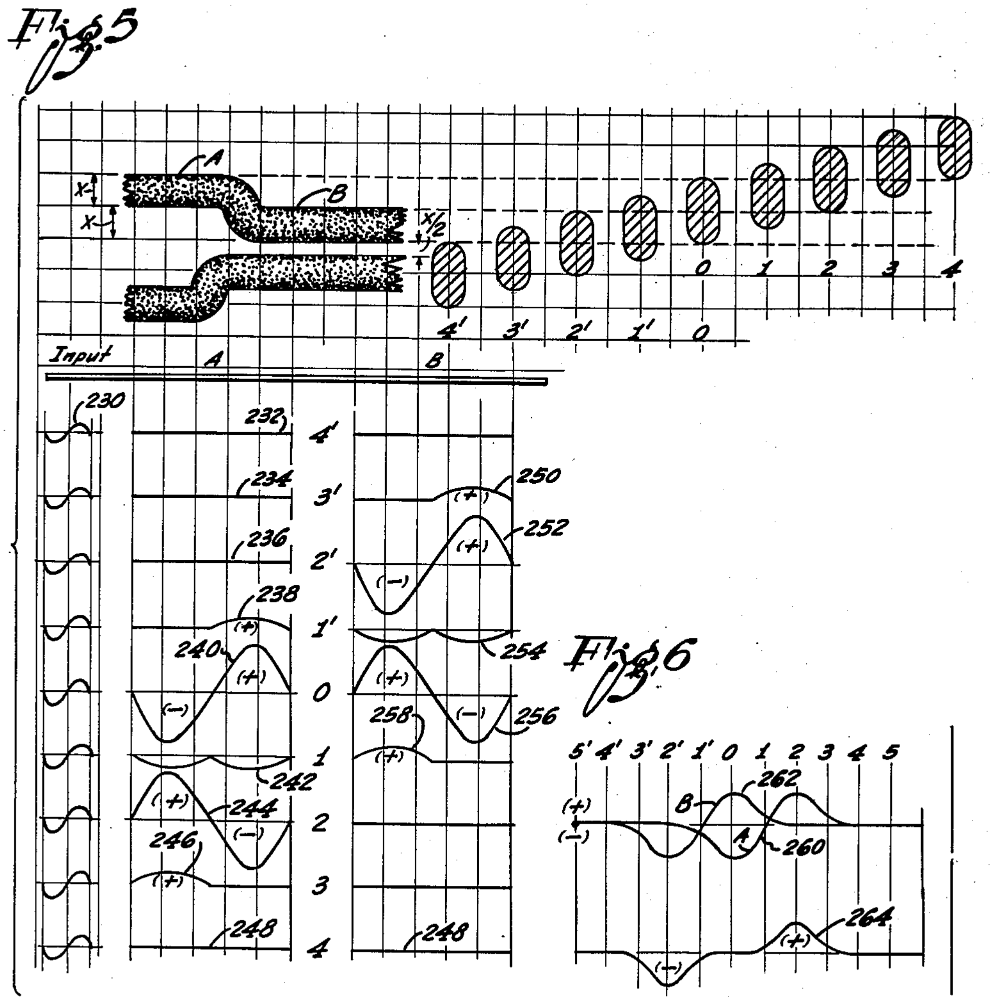
FIGURE 5 illustrates a plurality of curves of signals produced upon the occurrence of different deviations in the scan of each line.
FIGURE 6 illustrates curves of signals representing the composite of the signals produced in FIGURE 4.

The signals from the stages 16 are introduced to one of the plates 18 in a cathode ray tube 20 for controlling the vertical deflection of the signals. The cathode ray tube 20 may be constructed in a conventional manner to produce a flying spot which moves horizontally across the face of the tube. Since the signals from the stages 18 control the vertical deflection of the flying spot in the tube 20 at each instant, signals are visually produced on the face of the tube in a manner similar to that indicated at the top of FIGURE 5. These signals have a first vertical position A and a second vertical position B in each line. The signals may have a width X at each instant and may be deflected through a vertical distance X between the positions A and B so as to occupy a total distance of 2X in the vertical direction. The minimum distance between each pair of successive lines may be $X/2$, as also indicated in FIGURE 5. The signals may be focused by a lens system 22 and may be recorded on the film 10 in a movie camera 24.

Figure 1:
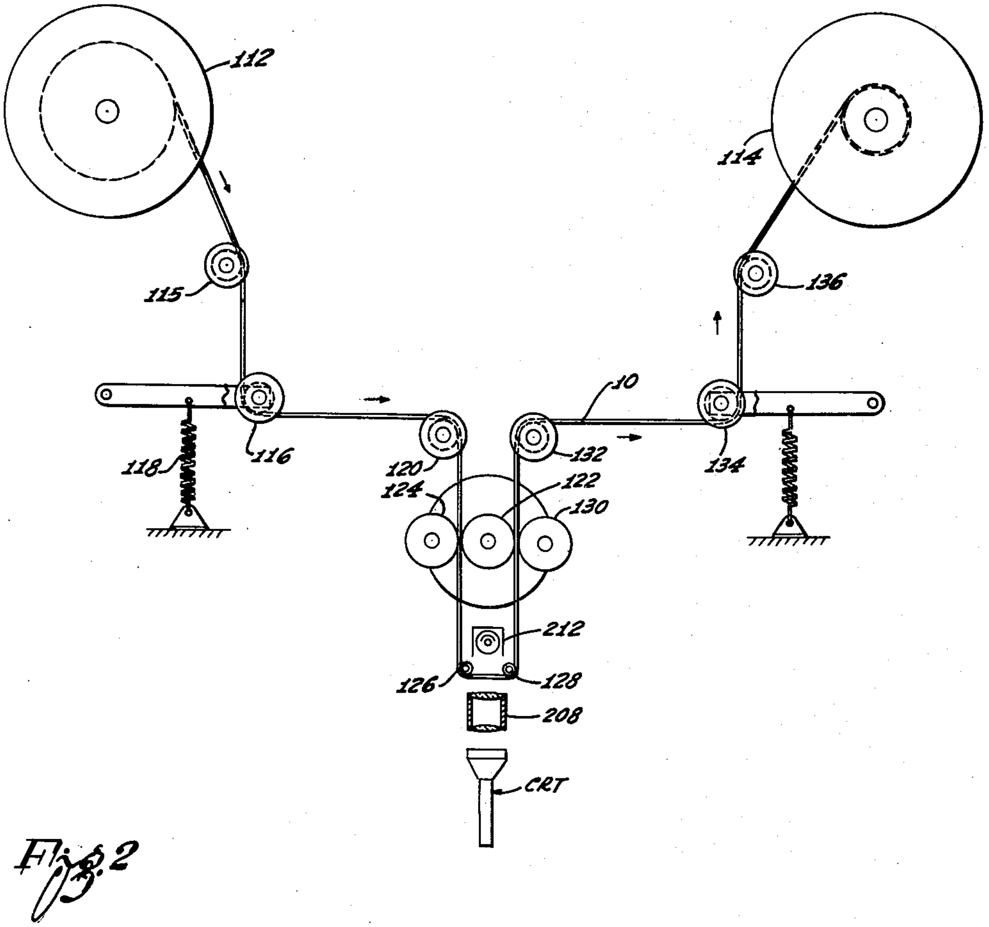
FIGURE 1 is a schematic diagram of apparatus for driving a medium such as a thin film and also indicates the position of certain components included in the invention relative to the film drive.

The apparatus shown in FIGURE 1 is used when a reproduction is desired of the information recorded on the tape. In the apparatus shown in FIGURE 1, the medium such as the photographic film 10 is driven in the direction indicated by arrows so as to become unwound from a pay-out reel 112 and become wound on a take-up reel 114. The film 10 unwound from the pay-out reel 112 passes over a guide roller 115 and a guide roller 116, which may be controllably tensioned by a spring 118. The guide roller 116 then directs the film to pass at a substantially constant angle over a guide roller 120. The film then makes a turn of approximately 90° and passes between a capstan 122 and a pressure roller 124. The capstan 122 and the pressure roller 124 act to maintain a particular tension on the film.

After moving past the capstan 122 and the pressure roller 124, the film 10 moves past a guide 126 which turns the film toward a guide 128. The film then passes between the capstan 122 and a pressure roller 130 which is disposed on the opposite side of the capstan from the pressure roller 124. The film then is turned by a guide roller 132 through an angle of approximately 90° and is directed to a guide roller 134 controllably tensioned in a manner similar to the guide roller 116. The film passes from the guide roller 134 over a guide roller 136 to the take-up reel 114.

Figure 3:
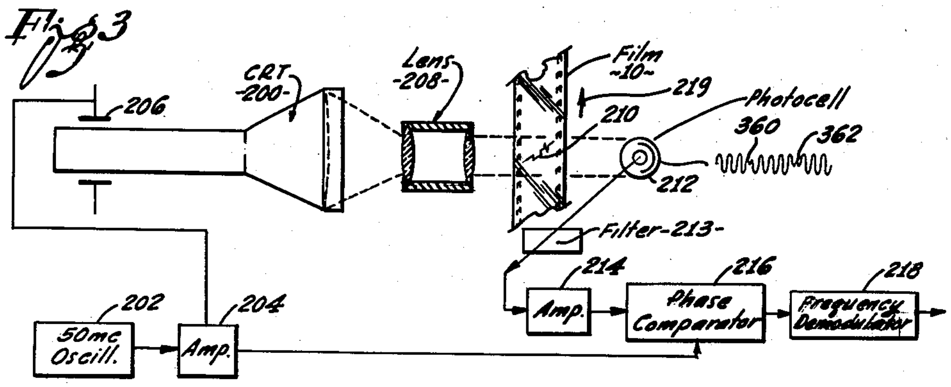
FIGURE 3 is a block diagram of a system for reproducing the information recorded on the medium by the system shown in FIGURE 2 and illustrates schematically the disposition of the medium relative to various components in the reproducing system.

FIGURE 3 illustrates a system for reproducing the information previously recorded on the film 10. The system shown in FIGURE 3 includes a cathode ray tube 200 which may be constructed in a conventional manner to produce a flying spot which is swept horizontally. The flying spot is oscillated in the vertical direction at a relatively high frequency such as approximately 50 megacycles during the time that the flying spot is scanning in the horizontal direction. The vertical oscillations of the flying spot in the cathode ray tube 200 are obtained by amplifying in an amplifier 204 signals from an oscillator 202 and by introducing the signals from the amplifier 204 to one of the plates 206 in the tube 200 for controlling the vertical position of the flying spot.

The flying spot from the tube 200 is collimated and concentrated by a lens 208 or lenses and is then directed toward the film 10, which is moved upwardly in FIGURE 3 as indicated by the arrow. When the flying spot passing through the lens 208 coincides in position with a dark line on the film such as that indicated at 210 in FIGURE 3, an interruption is produced in the light passing through the film. This interruption causes a change in signal to be produced by a photocell 212. When the dark line 210 being scanned on the film 10 has the upper of the two positions, the upper portion of each oscillatory signal from the tube 200 is interrupted by the film so as to produce changes in the signals in the photocell 212. Similarly, when the dark line 210 being scanned on the film 10 has the lower of the two positions, the lower portion of each oscillatory signal from the tube 200 is interrupted by the film so as to produce changes in the signals in the phototcell 212. In this way, the phase of the oscillatory signal produced by the photocell 212 is dependent upon the occurrence of the dark line 210 at either the upper level or the lower level at the position being scanned. This causes the photocell 212 to produce signals with phase shifts of 180° as indicated at 360 and 362 in FIGURES 3 and 4.

The signals from the photocell 212 are filtered by a filter 213, amplified in a stage 214 and introduced to a phase comparator 216. The comparator 216 operates to compare the phase of the oscillatory signal produced in the photocell 212 with the phase of the oscillatory signals from the amplifier 204. When the photocell 212 passes only the positive portion of each oscillatory signal on the face of the tube 200, the signal produced by the phase comparator 216 has a positive polarity. Similarly, the signal produced by the phase comparator 216 has a negative polarity when the photocell 212 passes the negative portion of each oscillatory signal on the face of the tube 200.

The phase comparator 216 accordingly operates to produce an electrical signal having at each instant amplitude characteristics dependent upon whether the position being scanned on the line at that instant has the first level or the second level in the direction of the arrow 219 in FIGURE 3. The signals produced by the comparator 216 are introduced to a frequency demodulator 218 which operates to convert the frequency of the signals at each instant into signals having a corresponding amplitude. The amplitude of the signals from the demodulator 218 may be used to control the intensity of light at successive positions on the face of the picture tube in a television receiver so as to produce pictures corresponding to the video input in FIGURE 2.

The flying spot has a thickness "X" in FIGURE 5 and oscillates through a path having an amplitude "X" so as to describe a path having a distance "2X." The optimum position of the flying spot is indicated at "0" near the top of FIGURE 5 since the flying spot oscillates between the first level A and the second level B in each line without transgressing the limits defined by A and B. It may sometimes occur, however, that the flying spot directed from the cathode ray tube 200 to the film 10 may deviate from a desired position in the direction of the arrow in FIGURE 3. For example, progressive deviations occur in a first direction from the optimum position "0" in FIGURE 5 to successive positions "1," "2," "3" and "4" in FIGURE 5. Similarly, progressive deviations occur in a second direction from the optimum position "0" to successive positions "1′," "2′," "3′" and "4′" in FIGURE 5.

FIGURE 5 also illustrates the signals produced when the flying spot has the different positions shown at the top of FIGURE 5. As will be seen at 230 in a first vertical column in the middle and bottom of FIGURE 5, the flying spot follows a pattern in which it is first deflected downwardly from an intermediate position to a bottom position, then upwardly past the intermediate position to a top position and then downwardly to the intermediate position. The second vertical column illustrates the waveshape of the signals produced at the photocell 212 in FIGURE 3 when the flying spot has the different positions 0 to 4 and 1′ to 4′ shown at the top of FIGURE 5 and when the image being scanned on the line has the position A in FIGURE 5. In like manner, the last vertical column in FIGURE 5 illustrates the waveshape of the signals produced at the photocell 212 in FIGURE 3 when the flying spot has the different positions 0 to 4 and 1′ to 4′ shown at the top of FIGURE 5 and when the image being scanned on the line has the position B in FIGURE 5. The different positions 0 to 4 and 1′ to 4′ are indicated between the first and last vertical columns.

As will be seen at 232, 234 and 236 in FIGURE 5, no signals are produced by the photocell 212 upon the occurrence of a vertical level A and upon the oscillation of the flying spot through the positions 4′, 3′ and 2′. In the position 1′, a signal is produced in only the second half of each oscillation and not in the first half of each oscillation as indicated at 238 in FIGURE 5. In the position 0, a signal of optimum amplitude is produced in both halves of each oscillation of the flying spot when the line being scanned has the position A, this signal being indicated at 240 in FIGURE 5. In the position 1, the signal repeats in each half of each oscillation of the flying spot when the line being scanned has the position A, such that a signal constituting the second harmonic of the fundamental is produced. This second harmonic signal is indicated at 242 in FIGURE 5 and is removed by the filter 213 in FIGURE 3 so that effectively no signal is produced.

When the flying spot oscillates through a path indicated by the position 2 and the line being scanned has the level A, a signal 244 is produced. As will be seen, the signal 244 has a phase opposite to that of the signal 240. A signal 246 is produced in the first half cycle of each oscillation of the flying spot when the flying spot oscillates through the path 3 and the line being scanned on the film 10 has the level A. As will be seen, the signal 246 has a phase opposite to the phase of the signal 238. As indicated at 248 in FIGURE 5, no signal is produced upon the oscillation of the flying spot through a path represented by the position 4 whether the line being scanned has the level A or the level B.

The characteristics of the signal produced by the photocell 212 at each instant are not only dependent upon the position of the flying spot from the tube 200 relative to the line being scanned at each instant but are also dependent upon whether the line has the level A or B. For example, a signal 250 is produced when the line being scanned has a level B and the flying spot traverses the path 3′. Similarly, signals 252, 254, 256 and 258 are produced with the line being scanned at the level B and with the flying spot respectively traversing the positions 2′, 1′, 0 and 1. As will be seen, the signal 254 constitutes the second harmonic such that it is effectively filtered by the filter 213 in FIGURE 3.

FIGURE 6 illustrates a single plot of amplitude and phase versus displacement of all of the signals 232 to 258, inclusive (even numbers only) shown in FIGURE 5. As will be seen, a resultant signal 260 is produced with the line being scanned in the position A and with different displacements of the flying spot between the positions 4′ and 4. In like manner, a resultant signal 262 is produced when the line being scanned has the level B and the position of the flying spot varies between the positions 4′ and 4.

By combining the signals 260 and 262, a composite control signal 264 is produced. The signals 260 and 262 can be combined to produce the composite control signal 264 since the occurrence of the level A in each line tends to equal the occurrence of the level B on an average basis. In this way, the composite signal 264 represents the instantaneous deviations of the flying spot from the optimum position 0. As will be seen, no error signal is produced when the flying spot 0 deviates from the position 0 downwardly to the position 1′ or upwardly to the position 1. For downward deviations beyond the position 1, a signal of negative polarity is produced. The amplitude of this negative signal is dependent upon the amount of such downward deviation of the flying spot. Similarly, a signal of positive polarity is produced for upward deviations beyond the position 1, the amplitude of the error signal being dependent upon the extent of such deviations.

Figure 4:
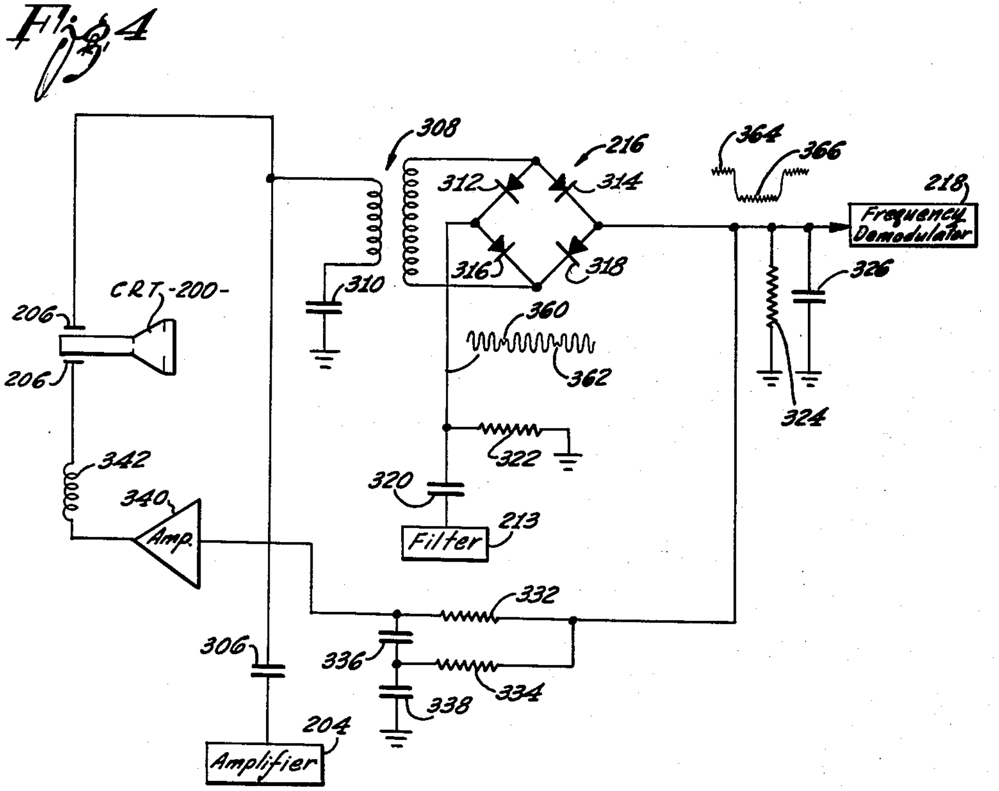
FIGURE 4 is a circuit diagram of a system included in this invention for scanning the information previously recorded on the medium such as the film and for reproducing such information and for operating to insure that the scan follows the information recorded on the film.

FIGURE 4 illustrates in detail certain of the stages shown in block form in FIGURE 3 and further illustrates circuitry which uses the error signal 264 in FIGURE 5 to control the positioning of the flying spot from the cathode ray tube 200. The stages shown in FIGURE 4 include the amplifier 204 which introduces signals at the frequency of 50 megacycles per second through a capacitor 306 to one of the plates 206 in the tube 200. The signals passing through the capacitor 306 are also introduced to one of the terminals in the primary winding of a transformer generally indicated at 308. A capacitor 310 is connected between the second terminal of the primary winding in the transformer 310 and a suitable reference potential such as ground.

The secondary winding of the transformer 308 is connected to the phase comparator 216. The phase comparator includes four diodes 312, 314, 316 and 318 connected in a bridge arrangement to become simultaneously forward biased (i.e., conductive). One terminal of the secondary winding in the transformer 308 is connected to the plates of the diodes 312 and 314 and the second terminal of the secondary winding is connected to the cathodes of the diodes 316 and 318. The cathode of the diode 312 and the plate of the diode 316 receive the signals passing through a capacitance 320 from the filter 213 (also shown in FIGURE 3). Connections are also made from the cathode of the diode 312 and the plate of the diode 316 to the first terminal of a resistance 322, the second terminal of the resistance 322 extending electrically to the reference potential such as ground. The output signals on the cathode of the diode 314 and the plate of the diode 318 are introduced to the input terminal of the frequency demodulator 218 (also shown in FIGURE 3) and to first terminals of a resistance 324 and a capacitance 326. The second terminals of the resistance 324 and the capacitance 326 are connected to the reference potential such as ground.

The signals on the cathode of the diode 314 and the plate of the diode 318 are also introduced to first terminals of a pair of resistances 332 and 334. A capacitance 336 is connected between the second terminals of the resistances 330 and 332 and a capacitance 338 is disposed electrically between the reference potential such as ground and the terminal common to the resistance 334 and the capacitance 336. The signals on the terminal common to the resistance 332 and the capacitance 336 pass to an amplifier 340, which then introduces amplified signals to a choke coil 342. The choke coil 342 is constructed to pass signals of relatively low frequency and to prevent the passage of signals of high frequency. The signals passing through the choke coil 342 are introduced to the second one of the plates 206 for controlling the vertical deflection of the flying spot in the tube 200.

As previously described, the signals at 50 megacycles from the amplifier 204 are introduced to the tube 200 to control the production of signals by the photocell 212 in FIGURE 3 and to control the passage of signals through the filter 213 in FIGURES 3 and 4. The signals at 50 megacycles are also introduced to the primary winding of the transformer 308 such that signals at the same frequency are induced in the secondary winding. The transformer 308 is provided with properties so that, either alone or in combination with the capacitors 306 and 310, the secondary winding produces a signal which is substantially in phase or 180° out of phase with the signals passing through the filter 213. The capacitor 306 also operates to prevent any direct voltage from being introduced to the primary winding of the transformer 308. The capacitor 310 is further included to isolate the upper plate of the tube 200 in FIGURE 5 relative to ground from the standpoint of direct voltage.

The balanced modulator 216 compares the phase of the signal across the secondary winding of the transformer 308 and the phase of the signal from the filter 213 to produce signals representing such comparative phases. The operation of the balanced modulator 216 results from the fact that all of the diodes 312, 314, 316 and 318 are forward biased during the introduction of a positive signal on the plates of the diodes 213 and 314 relative to the signal on the cathodes of the diodes 316 and 318. Since all of the diodes are forward biased at such time, the impedances of the diodes are relatively low and the voltage drop across the diodes is negligible. This causes the voltage introduced at each instant to the cathode of the diode 312 and the plate of the diode 316 to appear on the cathode of the diode 314 and the plate of the diode 318. When the diodes 312, 314, 316 and 318 are forward biased, current flows through the capacitor 326 to charge the capacitor. Because of the charge in the capacitor 326, the diodes 312, 314, 316 and 318 actually become forward biased only at the positive peaks of the signals induced in the secondary winding of the transformer 308.

As previously described, the signals passing through the filter 213 have a first phase when the line being scanned on the film 10 has the level A. Similarly the signals passing through the filter 213 have a second phase opposite to the first phase when the line being scanned on the film 10 has the level B. Because of this 180° difference in phase, the signals passing through the filter 213 have phase shifts as indicated at 360 and 362 in FIGURE 4 when the level changes from A to B and subsequently back to A.

When the signal passing through the filter 213 is in phase with the signal introduced to the modulator 216 from the secondary winding of the transformer 308, the signal introduced to the cathode of the diode 312 has a peak amplitude at the time that the diodes in the modulator became forward biased. This causes a signal having a relatively high amplitude to be produced across the capacitor 326, as indicated at 364 in FIGURE 4. Similarly, when the signal passing through the filter 213 is 180° out of phase with the signal introduced to the modulator 216 from the transformer 308, the signal on the cathode of the diode 312 has a relatively low amplitude at the time that the diodes in the modulator become forward biased. This causes a signal 366 in FIGURE 4 to be produced across the capacitor 326. The signal 366 may be produced to have an amplitude equal to that of the signal 364 but of a polarity opposite to that of the signal 364 if the proper reference potential is chosen. The voltage across the capacitor 326 is able to change from a positive amplitude to a negative amplitude because of the discharge of the capacitor through the resistance 324.

It will be seen from the previous paragraph that signals are produced across the capacitor 326 with frequency modulations corresponding to those produced by the modulator 14 in FIGURE 2. These frequency modulated signals are substantially free of any amplitude modulations at 50 megacycles because of the filtering action provided by the capacitor 326 and the resistance 324. The filtering action is obtained because the capacitor 326 and the resistance 324 are provided with a time constant representing a frequency of approximately 20 megacycles per second.

The frequency modulated signals produced across the capacitor 326 are introduced to the RC circuit represented by the resistance 332 and the capacitor 336. This RC circuit is provided with a time constant corresponding to a frequency of approximately 1 megacycle per second. After a few swings of the signal between the levels 364 and 366 in FIGURE 5, the RC circuit produces across the capacitor 336 a direct voltage representing the deviations of the flying spot from the optimum position. The signal produced across the capacitor 336 at each instant corresponds to the signal 264 in FIGURE 5 and has a polarity and amplitude representing such deviations in the position of the flying spot.

The resistance 334 and the capacitor 338 also provide an RC network. This RC network has a time constant corresponding to a frequency of approximately 4000 cycles per second. The RC network operates to produce across the capacitor 338 a voltage representing such deviations of the flying spot as result from flutter in the movements of the film 10. A voltage is also produced across the capacitor 338 in representation of cyclic deviations known colloquially in the art as "wow."

The signals produced across the capacitors 336 and 338 are amplified by the stage 340 and are introduced to the second plate 206 of the cathode ray tube 200. This signal causes the flying spot in the tube 200 to be shifted in the vertical direction through a distance to correct for deviations in the flying spot from the area between the positions 1 and 1' in FIGURE 5 in the line being scanned. The flying spot is shifted on an instantaneous basis in accordance with the production of signals across the capacitors 336 and 338. Because of this, the flying spot is maintained on the line being scanned in accordance with the instantaneous production of error signals during the scan of the line. Since instantaneous corrections for deviations of the flying spot are obtained during the scan of each line, the system shown in FIGURE 4 automatically corrects for any skew in the positioning of the film 10 relative to the tube 200. Furthermore, any error signals produced across the capacitor 336 at the end of each line do not affect the controls exerted on the position of the flying spot during the scan of the next line. The reason is that any charge in the capacitor 336 at the end of each line becomes discharged through the resistance 332 during the retrace of the flying spot from the end of that line to the beginning of the next line.

The capacitance 320 and the resistance 322 also provide an RC network. This RC network operates to discharge any direct charge which may tend to accumulate in the capacitor 320. Such a direct charge is undesirable since it represents an average intensity of light from the photocell 212. By preventing such a direct charge across the capacitance 320, a signal representing an average intensity of brightness is prevented from being produced and from affecting the characteristics of the signals introduced to the balanced modulator 216.

As will be seen, several RC circuits are included in FIGURE 4. However, each RC circuit has a time constant considerably different from that of the other RC circuits. Because of this, the operation of each RC circuit does not affect the operation of the other RC circuits.

Figure 7:
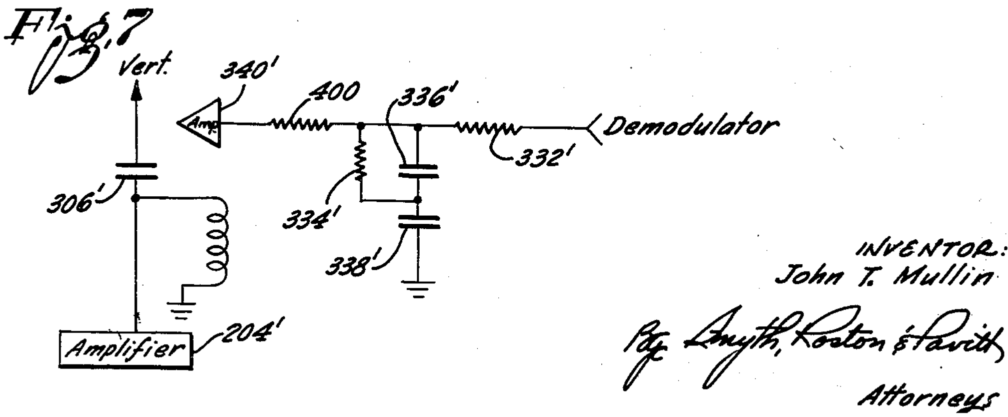
FIGURE 7 is a circuit diagram of a modified embodiment of certain stages shown in FIGURE 4.

FIGURE 7 illustrates a modification of the circuit shown in FIGURE 4. In FIGURE 7, elements corresponding to those shown in FIGURE 4 are designated by the same numeral as in FIGURE 4 but with a prime (′) following the numeral. The elements shown in FIGURE 7 include resistances 332′ and 334′ and capacitors 336′ and 338′. The resistance 332′ and the capacitance 336′ form one RC network and the resistance 334′ and the capacitance 338′ form a second RC network. As will be seen, the resistance 334′ is connected directly across the capacitance 336′ in FIGURE 7. FIGURE 7 also includes a resistance 400 disposed electrically between one of the plates 206 in the capacitance 200 and the resistance 332′. The resistance 400 is provided with a value to introduce all of the error signals across the capacitors 336′ and 338′ to the plate of the tube 200 without producing a phase shift in the 50 megacycle signals passing through the capacitor 306′. It will be appreciated that the resistance 400 can be eliminated if the amplifier 340′ is provided with characteristics to provide good electrical isolation between the signals at the terminal common to the resistance 332 and the capacitance 336 and the signals passing to the plate 206.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination in apparatus for reproducing information represented by the frequency modulations in signals recorded on a medium movable in a first direction where the signals are recorded in lines transverse to the first direction, first means responsive to the signals recorded in each line for reproducing the information represented by the signals, means operatively coupled to the first means for producing control signals having at each instant characteristics representing instantaneous deviations in the first direction of the positioning of the first means relative to the line of information being reproduced at that instant, and means responsive to the characteristics of the control signals at each instant for varying the position in the first direction of the first means relative to the line being scanned.

2. In combination in apparatus for reproducing information represented by the frequency modulations in signals recorded on a medium movable in a first direction where the signals are recorded in lines transverse to the first direction, first means responsive to the signals recorded in each line for reproducing the information represented by the signals, means operatively coupled to the first means for producing control signals having instantaneous characteristics representing deviations in the first direction of the positioning of the first means relative to the line of information being reproduced at that instant, means responsive to the characteristics of the control signals at each instant for varying the position in the first direction of the first means relative to the line being scanned, and means operatively coupled to the first means for preventing the production of any control signals upon the completion of the scan of each line and in representation of a cumulative effect during the scan of successive lines.

3. In combination in apparatus for reproducing information represented by the frequency modulations in signals recorded on a medium movable in a first direction where the signals are recorded in lines transverse to the first direction, first means for scanning each line to reproduce the information represented by the signals recorded in the line and for providing a retrace from each particular line to the next line upon the completion in the scan of the particular line, means operatively coupled to the first means for producing control signals having at each instant characteristics representing instantaneous deviations in the first direction in the positioning of the first means relative to the line of information being reproduced at that instant, means responsive to the characteristics of the control signal at each instant for varying the position in the first direction of the first means relative to the line being scanned, and means operative during the retrace from each particular line to the next particular line for eliminating the control signal to obtain the production of a new control signal in the next line only in accordance with the deviations in the positioning of the first means relative to such next line of information.

4. In combination in apparatus for reproducing information represented by the frequency modulations in signals recorded on a medium movable in a first direction where the signals are recorded in lines transverse to the first direction and where the frequency modulations are represented in such lines by first and second positions in the direction of movement of the medium, means for providing reference signals at a particular frequency greater than the rate of change between the first and second positions in each line, means responsive to the reference signals at the particular frequency for scanning back and forth across the first and second positions in each line in accordance with the changes in amplitude of the reference signals, means responsive to the coincidence between the scanning means and the first and second positions in each line for producing at the particular frequency resultant signals having a phase dependent upon the occurrence of the first and second positions, means responsive to the reference signals and the resultant signals for producing at each instant signals having an amplitude dependent upon the phase of the resultant signals at that instant, and means responsive to the signals produced by the last mentioned means for reproducing the information recorded on the medium.

5. In combination in apparatus for reproducing information represented by the frequency modulations in signals recorded on a medium movable in a first direction where the signals are recorded in lines transverse to the first direction and where the frequency modulations are represented in such lines by first and second positions in the direction of movement of the medium, means disposed relative to the first and second positions in each line on the medium for scanning back and forth in the first direction at a particular frequency to cross the first and second positions on the line, means responsive to the coincidence between the first and second positions in the line and successive signals in the scan to produce at the particular frequency signals having at each instant a particular phase relationship dependent upon the occurrence of the first and second positions in the line, means responsive to the signals produced by the last mentioned means and to the scanning signals for demodulating the signals produced by the last mentioned means to produce signals having first and second amplitudes corresponding to the frequency modulations of the first and second positions in the line and corresponding to the frequency modulations in the recorded signals, and means responsive to the signals produced by the last mentioned means for reproducing the information recorded on the medium.

6. In combination in apparatus for reproducing information represented by the frequency modulations in signals recorded on a medium movable in a first direction where the signals are recorded in lines transverse to the first direction and where the frequency modulations are represented in such lines by first and second positions in the direction of movement of the medium, first means responsive to each of the recorded lines and to the first and second positions in each of such lines for producing signals having frequency modulations representing such positions, means responsive to the frequency modulated signals produced by the last mentioned means and operative during the production of the frequency modulated signals in each line for producing control signals representing any deviation in the first direction of the first means from a particular relationship with respect to the first and second positions in that line, means responsive to the control signals produced in each line for providing a relative adjustment between the first means and the medium to position the first means in the first direction in the particular relationship with respect to the first and second positions in that line, and means responsive to the frequency modulated signals for recovering the information represented by the frequency modulations in the signals.

7. In combination in apparatus for reproducing information represented by the frequency modulations in signals recorded on a medium movable in a first direction where the signals are recorded in lines transverse to the first direction, first means responsive to each of the recorded lines for producing signals having frequency modulations in accordance with the information represented by each of the lines, means responsive to the frequency modulated signals for recovering the information represented by the frequency modulations in the signals, means responsive to the frequency modulated signals for producing control signals having at successive instants of time characteristics instantaneously representing deviations in the positioning in the first direction between the first means and each line on the medium, and means responsive to the control signals produced during the presentation of each line on the medium to provide instantaneous adjustments in the first direction between the medium and the first means during the reproduction of the information from that line.

8. In combination in apparatus for reproducing information represented by the frequency modulations in signals recorded on a medium movable in a first direction where the signals are recorded in lines transverse to the first direction, first means responsive to each of the recorded lines for producing signals having frequency modulations in accordance with the information represented by each of the lines, means responsive to the frequency modulated signals for recovering the information represented by the frequency modulations in the signals, means responsive to the frequency modulated signals for controlling the positioning in the first position of the first means relative to successive positions on each line on the medium, and means operatively coupled to the control means for obtaining an independent control over the positioning in the first direction of the first means relative to the medium in successive lines without any carry-over in control from each line to the next.

9. In combination in apparatus for reproducing information represented by the frequency modulations in signals recorded on a medium movable in a first direction where the signals are recorded in lines transverse to the first direction and where the frequency modulations are represented in such lines by first and second positions in the direction of movement of the medium, first means responsive to each of the recorded lines and to the first and second positions in each of such lines for producing signals having frequency modulations representing such positions, means responsive to the frequency modulated signals produced by the last mentioned means and operative during the production of the frequency modulated signals in each line for producing control signals representing any deviation in the first direction of the first means from a particular relationship with respect to the first and second positions in that line, and means responsive to the control signals produced in each line for providing a relative adjustment in the first direction between the demodulating means and the moving means to position the first means in the particular relationship with respect to the first and second positions in that line.

10. In combination in apparatus for reproducing information represented by the frequency modulations in signals recorded on a medium movable in a first direction where the signals are recorded in lines transverse to the first direction, first means responsive to the signals recorded in each line for scanning each line to reproduce the information represented by the signals in the line, means operatively coupled to the first means for producing a direct voltage having a first polarity upon a deviation beyond particular limits in the scan of each line toward one side of the line in the first direction and for producing a direct voltage having a second polarity opposite to the first polarity upon a deviation beyond particular limits in the scan of each line toward the opposite side of the line in the first direction, and means responsive to the polarity of the direct voltage for varying the scan of each line in the first direction in accordance with the polarity of the direct voltage.

11. In combination in apparatus for reproducing information represented by the frequency modulations in signals recorded on a medium movable in a first direction where the signals are recorded in lines transverse to the first direction, scanning means responsive to the signals recorded in each line for reproducing such signals, means operatively coupled to the scanning means for producing error signals having an instantaneous polarity in accordance with the instantaneous deviations in the scan from a particular portion of each line in the first direction, means responsive to the error signals for varying the relationship between the medium and the scanning means in the first direction in accordance with the polarity of the error signals, and means responsive to the signals reproduced from each line for reproducing the information represented by the signals.

12. The combination set forth in claim 11 in which the error signal means are provided with characteristics for instituting a new production of the error signal upon each initiation in the scan of a new line on the medium.

13. In combination in apparatus for reproducing information represented by the frequency modulations in signals recorded on a medium movable in a first direction where the signals are recorded in lines transverse to the first direction, means responsive to the signals recorded in each line for scanning each line to reproduce the information represented by the signals in the line; first means responsive to the signals reproduced in each line and having a first time constant for producing first error signals having instantaneous characteristics representing the instantaneous deviation, and direction of deviation, of the scan from a particular portion of each line in the first direction; second means responsive to the signals reproduced in each line and having a second time constant for producing second error signals having instantaneous characteristics representing the flutter of the medium relative to the scanning means; means responsive to the first and second error signals for varying the position of the scan relative to the medium in the first direction in accordance with the characteristics of the first and second signals; and means responsive to the signals from the scanning means for reproducing the information represented by such signals.

References Cited in the file of this patent

UNITED STATES PATENTS

| | | |
|---|---|---|
| 2,828,478 | Johnson | Mar. 25, 1958 |
| 2,851,521 | Clapp | Sept. 9, 1958 |